Figure 1:
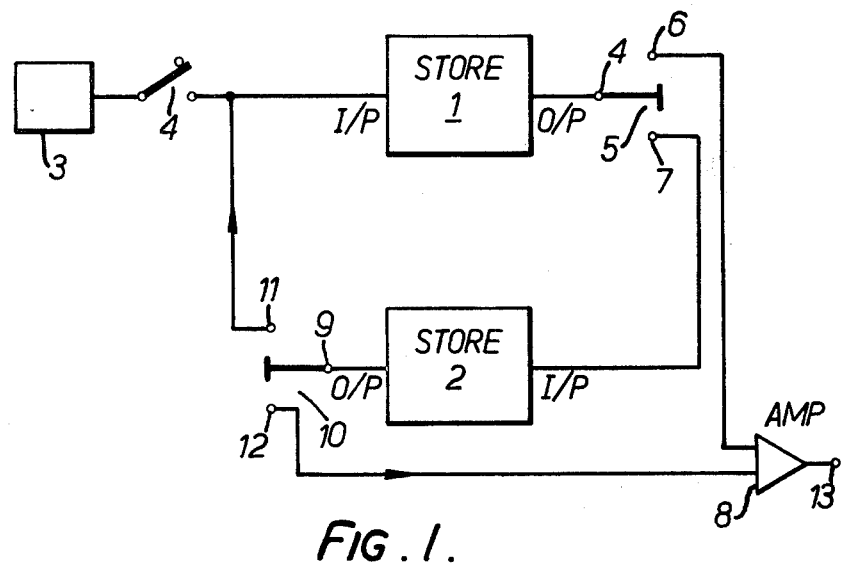

United States Patent [19]

Glenn

[11] 4,142,213
[45] Feb. 27, 1979

[54] APPARATUS FOR ELIMINATION OF DARK CURRENT UTILIZING CHARGE COUPLED DEVICES

[75] Inventor: Stephen J. Glenn, Chelmsford, England

[73] Assignees: Diller, Ramik & Wight; Elliott Brothers (London) Limited, Chelmsford, United Kingdom

[21] Appl. No.: 782,370

[22] Filed: Mar. 29, 1977

[30] Foreign Application Priority Data

Mar. 31, 1976 [GB] United Kingdom ............... 12908/76

[51] Int. Cl.$^2$ ................. H04N 5/14; H04N 5/21; H04N 5/30; H04N 3/14
[52] U.S. Cl. ................................................. 358/221
[58] Field of Search ............................... 358/221, 213

[56] References Cited

U.S. PATENT DOCUMENTS 3,584,146  6/1971  Cath et al. .......................... 358/221

Primary Examiner—Robert L. Richardson

[57] ABSTRACT

The invention concerns charge coupled devices and the problems of dark current effects. In an arrangement including a charge coupled device utilized as a storage element for data a second charge coupled device is provided. Data is applied to the first device during one half of the storage period, the content of the first device transferred to the second during the second half of the storage period and at the end of the storage period the stored contents of both devices are subtractively combined. In one particular case the arrangement is a CCD television camera of the field transfer type where the normally provided one charge coupled device is replaced by first and second charge coupled devices and the optical image from the optical section of the camera is directed first to one device and then to the second device and the contents of the two devices are exchanges at the end of a storage period.

6 Claims, 2 Drawing Figures

APPARATUS FOR ELIMINATION OF DARK CURRENT UTILIZING CHARGE COUPLED DEVICES

This invention relates to electronic arrangements including charge coupled devices and in particular to such arrangements where charge coupled devices are utilised as storage elements. One such arrangement of this last-mentioned kind is the so-called CCD (charge coupled device) television camera.

As is well known, charge coupled devices tend to suffer from so-called dark current effects. A CCD television camera, when operated at slow frame rates with long integration times, offers the potential for operation at very low light levels. However, the practical limit to integration time is set by the dark current characteristics of the charge coupled device. The dark current is generally different for different elemental portions of the charge coupled device and, with low light levels (i.e. with long integration times) when the dark current forms a significant proportion of the camera output, the image may be severely degraded, if not swamped, by the dark current pattern.

Dark current is similarly a problem when charge coupled devices are used simply as analogue storage elements and particularly where long storage times are required.

As is known dark current can be reduced by cooling and in any arrangement utilising a charge coupled device, where long storage times are envisaged, cooling will normally be provided for. Even in cooled systems, however, dark current still tends to be the ultimate limitation on potential storage time.

The present invention seeks to provide an improved electronic arrangement including a charge coupled device in which the problems associated with dark current are mitigated.

According to this invention an electronic arrangement including a charge coupled device utilised as a storage element for data is provided wherein in order to compensate for dark current effects there is provided a second charge coupled device, means for applying data to said first charge coupled device during one portion of a storage period, means for transferring the stored content of said one charge coupled device to said second charge coupled device for storage during a following portion of said storage period and means for subtractively combining the stored contents of both charge coupled devices at the end of said storage period.

Normally said one portion and said following portion of said storage period one half portions of said storage period.

Preferably said subtractively combining means comprises a differential amplifier.

According to a feature of this invention said electronic arrangement is a CCD television camera (that is to say a television camera incorporating an imaging charge coupled device as known per se) of the field transfer type wherein the normally provided one charge coupled device is replaced by said first and second charge coupled devices and there is provided means for directing an optical image from the optical section of said camera to said first charge coupled device during said one portions of said storage period and to said second charge coupled device during said following portion of said storage period and means for exchanging the stored contents of said two devices at the end of said one portion of said storage period.

Normally the arrangement is such that exchange of the stored contents of said two charge coupled devices takes place as said optical image is redirected from said one to said second charge coupled device.

Preferably said directing means comprises a mirror and means for moving said mirror into the optical path to said first charge coupled device in order to deflect the optical image towards said second charge coupled device, whilst interrupting passage of said optical image to said first charge coupled device.

Figure 2:
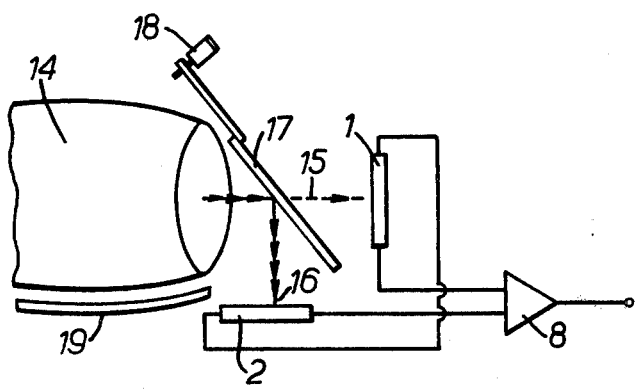

The invention is illustrated in and further described with reference to the accompanying drawing which, FIG. 1 schematically represents the general arrangement of one electronic arrangement in accordance with the present invention, and FIG. 2 schematically represents one CCD television camera arrangement of the field transfer type, in accordance with the present invention.

Referring to FIG. 1, the charge coupled devices are provided to act as storage elements. The first is referenced 1 and the second is referenced 2. Data signals from a data signal source 3 are arranged to be applied to the input of CCD store 1 via a switch 4. The output of CCD store 1 is connected to the input terminal 4 of a two-way switch 5 which is capable of connecting input terminal 4 to one or other of its two output terminals 6 and 7.

Output terminal 7 of switch 5 is connected to the input terminal of CCD store 2, whilst output terminal 6 is connected to one input terminal of a differential amplifier 8.

The output terminal of CCD store 2 is connected to the input terminal 9 of a two-way switch 10 which is capable of connecting input terminal 9 to one or other of two output terminals 11 and 12. Output terminal 11 of switch 10 is connected to the input of CCD store 1, whilst output terminal 12 is connected to a second input terminal of differential amplifier 8. The output terminal of differential amplifier 8 is connected to a utilisation output terminal 13.

In operation, data signals from source 3 to be stored are applied via switch 4 to CCD store 1 and then stored for one half of a storage period. During this time no input is applied to CCD store 2. At the end of the half storage period, switch 5 is operated to connect its input terminal 4 to its output terminal 7, whilst switch 10 is operated to connect its input terminal 9 to its output terminal 11 and switch 4 is opened (i.e. rendered non conductive). By this means the contents of CCD stores 1 and 2 are interchanged. Immediately prior to interchange the content of CCD store 1 will comprise the data signal plus dark current, whilst the content of CCD store 2 will comprise dark current alone.

The arrangement is now left static for the remaining half of the storage period so that at the end of the storage period CCD store 1 will contain both its own dark current pattern and that of CCD store 2. CCD store 2 will contain data signal together with its own and the dark current pattern of CCD store 1. Switches 5 and 10 are then operated so that the input terminal 4 of switch 5 is connected to its output terminal 6, whilst the input terminal 9 of switch 10 is connected to its output terminal 12. Thus the contents of CCD stores 1 and 2 are applied to the inputs of differential amplifier 8. The dark current patterns, which are similar in both stores, cancel, so that the data signal appears at the output of amplifier 8 at least substantially free of dark current.

Referring to FIG. 2, in this example the electronic arrangement is a CCD television camera of the field transfer type. The optical section of the camera is represented at 14. A first charge coupled device 1 is arranged to receive an optical image from the optical section 14 over path 15, whilst a second charge coupled device 2 is arranged to receive the optical image from the optical section 14 over path 16 when a mirror 17 is moved into the path 15 from the optical section 14 to the charge coupled device 1. Mirror 17 totally deflects the optical image so that when charge coupled device 2 is receiving an input, charge coupled device 1 is receiving no input. Movement of the mirror 17 is represented as being effected by a rotenoid electric motor 18.

As before the outputs of CCD stores 1 and 2 are shown as connected to a differential amplifier 8. In order to isolate CCD store 2 from spurious input from the optical section 14, this latter is provided with an optical shield represented at 19.

In operation, at the start of an integration period, mirror 17 is removed from the path 15 and the optical image from optical section 14 is applied as input to charge coupled device 1. A charge pattern due to the optical image will therefore build up upon device 1.

Meanwhile, charge coupled device 2 builds up only dark current.

Halfway through the integration period the contents of the two CCD stores 1 and 2 are interchanged and the mirror 17 inserted in the path 15 to cut off device 1 from optical input and direct the optical image on to device 2. The remainder of the optical image therefore builds up on device 2 during the remainder of the integration period. Once again the dark current in the two devices 1 and 2, at the end of the integration period, is similar and cancels in differential amplifier 8 whilst at the output of differential amplifier 8 appears the total video signal substantially free of dark current.

In order to avoid complication of FIG. 2, switches corresponding to switches 5 and 10 in FIG. 1 are not represented and in both Figures, again in order to avoid undue complication, timing circuits and the like are not shown.

I claim:
1. An electronic arrangement including a charge coupled device utilised as a storage element for data wherein in order to compensate for dark current effects there is provided a second charge coupled device, means for applying data to said first charge coupled device during one portion of a storage period, means for transferring the stored content of said one charge coupled device to said second charge coupled device for storage during a following portion of said storage period and means for subtractively combining the stored contents of both charge coupled devices at the end of said storage period.

2. An arrangement as claimed in claim 1 and wherein said one portion and said following portion of said storage period are half portions of said storage period.

3. An arrangement as claimed in claim 1 and wherein said subtractively combining means comprises a differential amplifier.

4. An arrangement as claimed in claim 1 and wherein said electronic arrangement is a CCD television camera of the field transfer type wherein the normally provided one charge coupled device is replaced by said first and second charge coupled devices and there is provided means for directing an optical image from the optical section of said camera to said first charge coupled device during said one portion of said storage period and to said second charge coupled device during said following portion of said storage period and means for exchanging the stored contents of said two devices at the end of said one portion of said storage period.

5. An arrangement as claimed in claim 4 and wherein the arrangement is such that exchange of the stored contents of said two charge coupled devices takes place as said optical image is redirected from said one to said second charge coupled device.

6. An arrangement as claimed in claim 5 and wherein said directing means comprises a mirror and means for moving said mirror into the optical path to said first charge coupled device in order to deflect the optical image towards said second charge coupled device, whilst interrupting passage of said optical image to said first charge coupled device.

* * * * *

UNITED STATES PATENT AND TRADEMARK OFFICE
CERTIFICATE OF CORRECTION

PATENT NO. : 4,142,213

DATED : Feb. 27, 1979

INVENTOR(S) : Stephen J. Glenn

It is certified that error appears in the above–identified patent and that said Letters Patent are hereby corrected as shown below:

On the title page correct the assignee's name as follows:

---[73] Assignee: Elliott Brothers (London) Limited, Chelmsford, county of Essex, England---

Signed and Sealed this

Eighth Day of May 1979

[SEAL]

Attest:

RUTH C. MASON
*Attesting Officer*

DONALD W. BANNER
*Commissioner of Patents and Trademarks*